(No Model.)
W. B. SEWARD.
CLAMP.
No. 478,822. Patented July 12, 1892.
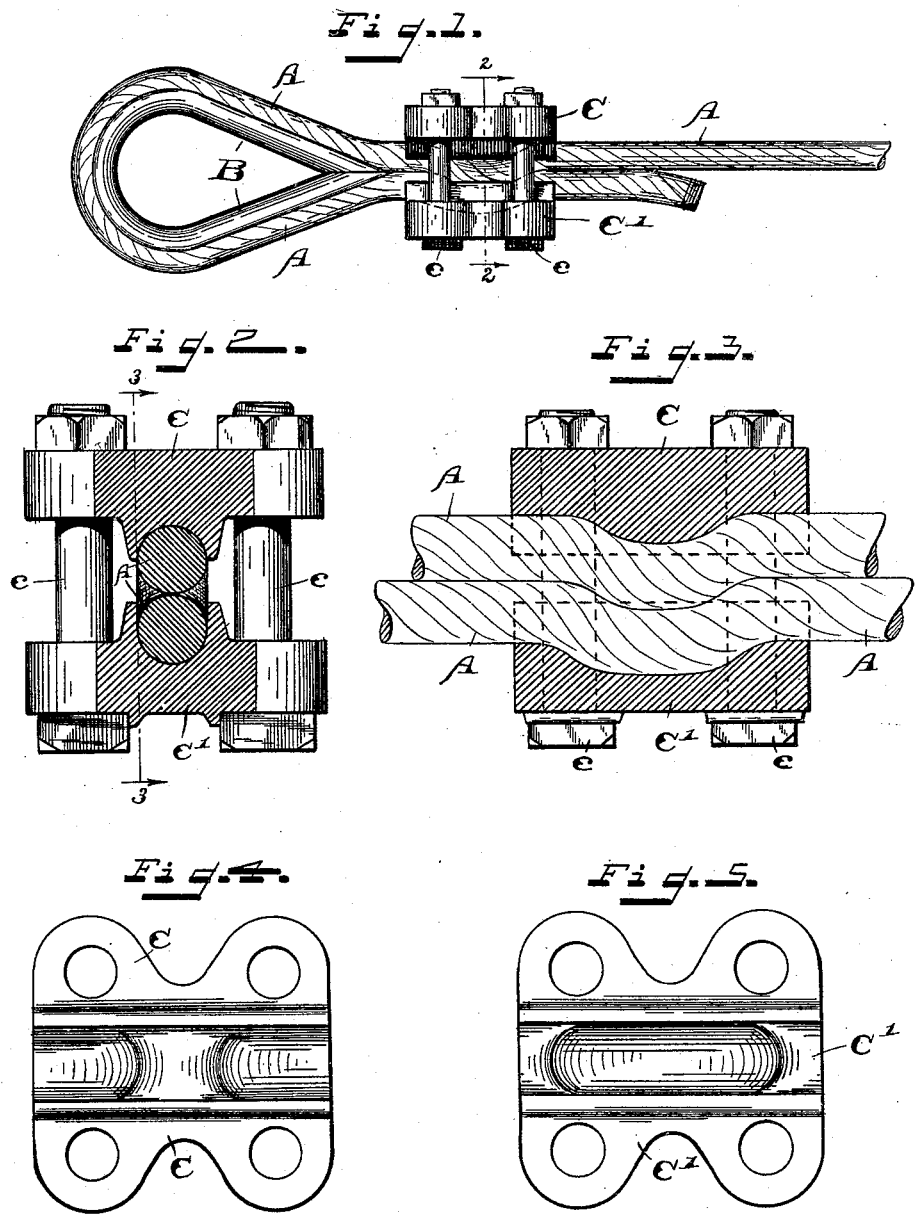
WITNESSES:
INVENTOR
Williamson B. Seward.

UNITED STATES PATENT OFFICE.

WILLIAMSON B. SEWARD, OF BLOOMINGTON, INDIANA.

CLAMP.

SPECIFICATION forming part of Letters Patent No. 478,822, dated July 12, 1892.

Application filed April 4, 1892. Serial No. 427,627. (No model.)

*To all whom it may concern:*

Be it known that I, WILLIAMSON B. SEWARD, a citizen of the United States, residing at Bloomington, in the county of Monroe and State of Indiana, have invented certain new and useful Improvements in Clamps, of which the following is a specification.

The object of my said invention is to produce a clamp which will securely hold ropes, wires, wire ropes, &c., when brought together into effective union and prevent the same from slipping, and is especially designed to be used in forming the eyes or loops in the ends of wire ropes, as illustrated in the drawings. As is well known, it has been difficult to form such unions effectively heretofore by simple and easily-manipulated devices.

My said invention is not only simple and easily manipulated, but is inexpensive. It will be first fully described, and then pointed out in the claims.

Referring to the accompanying drawings, which are made a part hereof, and on which similar letters of reference indicate similar parts, Figure 1 is a side elevation of the end of a wire rope bent around a thimble to form an eye or loop and the two portions united where they come together by my improved clamp; Fig. 2, a transverse sectional view of the same on the dotted line 2 2 in Fig. 1; Fig. 3, a longitudinal sectional view on the dotted line 3 3 in Fig. 2; Fig. 4, an inside view of one part of the clamp, and Fig. 5 an inside view of the other part of the clamp.

In said drawings the portions marked A represent the rope, B the thimble, and C C' the two parts of the clamp.

The rope A and thimble B are or may be of any desired form or character. The rope is shown as a wire rope, such as used in cables, heavy derricks, and such like places. The thimble is of the usual construction and forms the lining for the loop or eye.

The clamp is composed of the two parts C and C' and is formed so that one part substantially semi-incloses one portion of the rope and the other part substantially semi-incloses the other portion of the rope, said rope being brought around so that the two portions are in contact inside the clamp, as shown. One of the clamp parts is hollowed out or concaved longitudinally, as shown, centrally, and the other is correspondingly raised or convexed. The two parts are secured together by the bolts c. In placing this clamp in position the two portions of the rope are first brought around alongside each other, as shown, and the clamp parts put over them and the bolts inserted in place. The nuts are then turned up on the bolts, which forces the rope sidewise and forms offsets therein in conformity with the concaved formation just described, thus forming two bends (or a compound bend) in each portion. The slight irregularities on the surface of the rope formed by the twists thereof also settle into each other somewhat, and the rope, especially wire rope, being very stiff, it cannot be pulled out of place, as in order to do so the two bends therein would necessarily constantly be changed, besides which the irregular surfaces of the two portions where they come together must cut and tear away each other. To overcome these combined resisting forces is manifestly impossible, and therefore I have attained with a single clamp what has heretofore been secured, if at all, by a much more expensive and troublesome method.

As will be readily understood, my clamp is easily and quickly applied and as easily and quickly removed, when desired, and it is strong and durable.

Having thus fully described my said invention, what I claim as new, and desire to secure by Letters Patent, is—

1. A clamp for uniting wires, ropes, &c., consisting of two clamp parts adapted to fit on opposite sides of the two portions to be secured together, one of said clamp parts being concaved and the other correspondingly convexed, substantially as shown and described.

2. The combination, with two wires, ropes, or portions of the same, of a clamp consisting of two parts, one of which has a concave formation longitudinally and the other a correspondingly-convex formation, said clamp being thus adapted to form offsets or compound bends in the wire or rope to which it is applied.

In witness whereof I have hereunto set my hand and seal, at Indianapolis, Indiana, this 28th day of March, A. D. 1892.

WILLIAMSON B. SEWARD. [L. S.]

Witnesses:
CHESTER BRADFORD,
J. A. WALSH.